Aug. 4, 1964     S. FAURE     3,142,879
HAULING AND HOISTING GEAR INCORPORATING A METAL CABLE
Filed Oct. 3, 1962     2 Sheets-Sheet 1
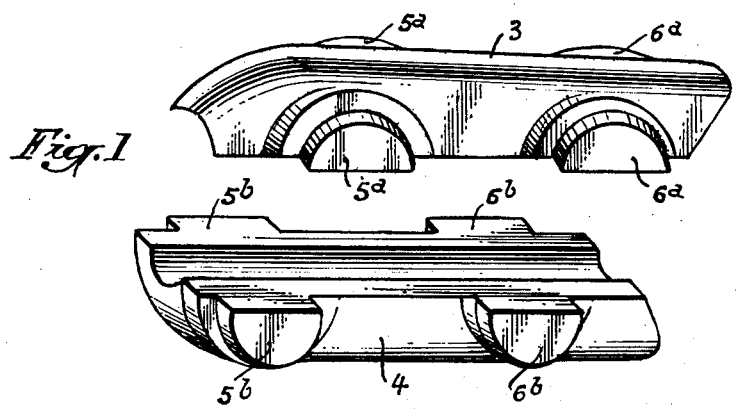
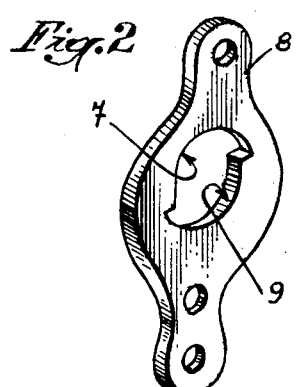
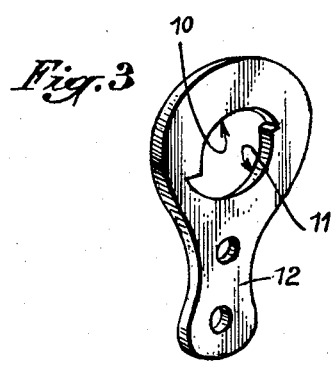
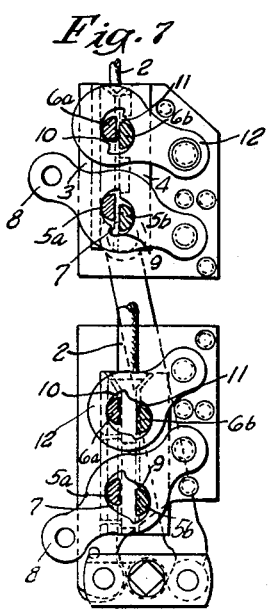
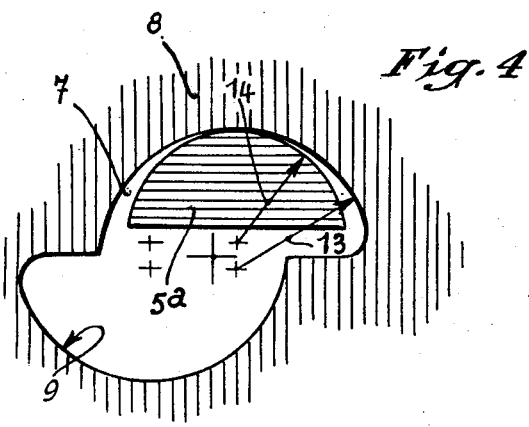

Aug. 4, 1964  S. FAURE  3,142,879
HAULING AND HOISTING GEAR INCORPORATING A METAL CABLE
Filed Oct. 3, 1962  2 Sheets-Sheet 2
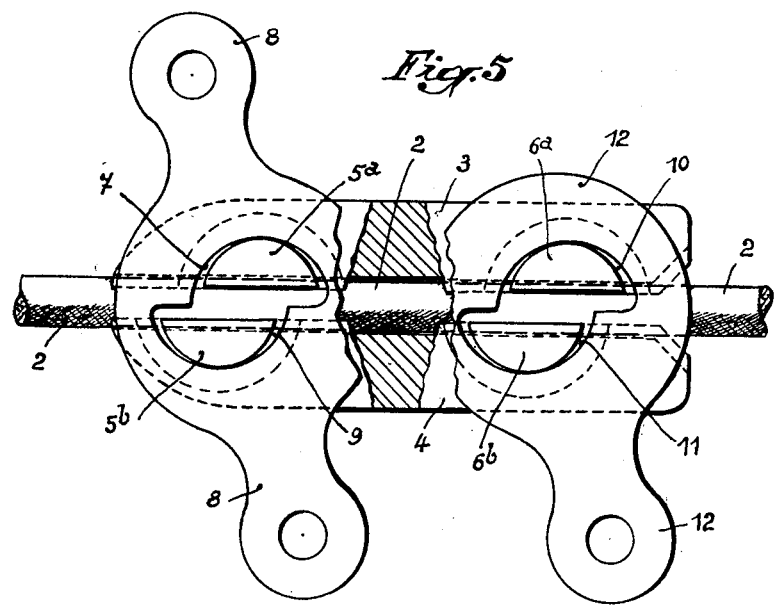
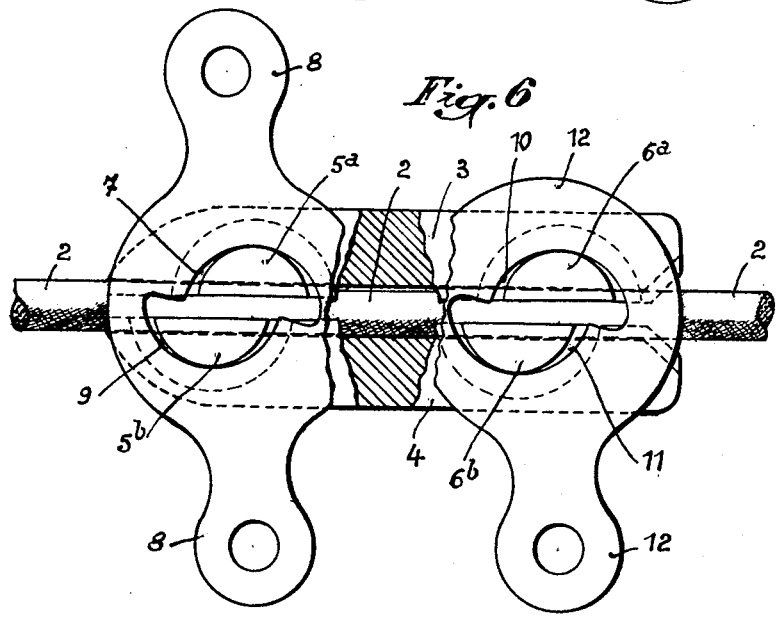
INVENTOR.
BY

United States Patent Office 3,142,879
Patented Aug. 4, 1964

3,142,879
HAULING AND HOISTING GEAR INCORPORATING A METAL CABLE
Simon Faure, 56 Rue Victor Herbert, Firminy, France
Filed Oct. 3, 1962, Ser. No. 228,060
Claims priority, application France Oct. 12, 1961
1 Claim. (Cl. 24—134)

My invention relates to hauling and hoisting apparatus operating through the agency of two self-clamping pairs of smooth jaws, which jaws are controlled by links which enclose within semi-circular perforations, semi-cylindrical trunnions carried by said jaws, as disclosed in particular by my prior U.S. Patent No. 2,585,101. The operation of such apparatus is unreliable, as soon as the load reaches a value equal to about 50% of the maximum load, by reason of the speedily increasing magnitude of the frictional stresses arising between the links and the trunnions of the jaws when the load increases.

My invention has for an object to reduce these frictional stresses exerted by the links on the jaw trunnions while ensuring simultaneously a better clamping of the cable.

According to an embodiment of the invention, each of the semi-circular recesses is arranged in symmetrical and stepped relationship in the links and each recess has a radius which is larger than that of the trunnion fitted in said recess, whereby the said recesses engage the cooperating trunnions along a single line of tangency, and the movement of the links leads to a rolling of said recesses over the trunnions. This permits oscillation of the links during the clamping of the cable by the jaws and provides a more rational and more energetic clamping, the friction being reduced by the rolling of the recesses whatever may be the magnitude of the load.

My invention will be readily understood from the following description, reference being made to the accompanying diagrammatic drawings illustrating by way of example and by no means in a limiting sense, a preferred embodiment of the improved structure. In said drawings:

FIG. 1 is a perspective view of the jaws,

FIGS. 2 and 3 are perspective views of the two controlling links,

FIG. 4 is an end view on a larger scale, of a semi-circular trunnion engaging the semi-circular recess formed in a cooperating link, FIG. 5 is a side view of the jaws in their open condition, FIG. 6 is a side view of the jaws when subjected to load and clamped over the cable, FIG. 7 shows a double set of jaws engaging successive points of a cable.

A cable 2 passes between the upper jaw 3 and a lower jaw 4. Said jaws 3 and 4 include to either side thereof two semi-circular trunnions, as shown respectively at 5a, 6a and at 5b, 6b.

The trunnions 5a and 6a of the upper jaw when fitted in their relative inoperative or operative position as illustrated in FIGS. 5 and 6 respectively are slightly offset transversely with reference to the trunnions 5b and 6b of the lower jaw 4. As in the case of my prior above-mentioned patent, the clamping of the jaws over the cable 2 is performed by shifting the jaws from the relative position illustrated in FIG. 5 into the clamping position illustrated in FIG. 6 for which the corresponding trunnions on the two jaws are brought nearer each other. This shifting is controlled by a pivotal movement imparted to the parallel links 8 and 12 provided each with an opening defined by two semi-circular interconnected recesses having their diametrical boundary line coinciding with each other with a slight longitudinal shifting to match the desired offset relationship between the two cooperating trunnions on the corresponding jaws. Consequently, the trunnions engage in pairs two recesses, to wit: the trunnions 5a and 5b engage the recesses 7 and 9 of the link 8, whereas the trunnions 6a and 6b engage the recesses 10 and 11 of the link 12 which is inoperative during upward movement.

The recesses 7 and 9 formed in the link 8 and also the recesses 10 and 11 formed in the link 12 have semi-circular outlines which are transversely shifted with reference to each other. The radius of each semi-circular recess 13 is larger by a few millimeters than the radius 14 of the semi-circular trunnion engaged therein while the center of the recess 13 is offset from the center of the trunnion as shown in FIG. 4 so as to ensure a clearance between the outlines of the cooperating recesses and trunnions to either side of the generating line of contact between said outlines.

Thus, upon angular shifting of the parallel links 8 and 12, the semi-circular outline of each recess 7–9–10–11 engaging the outer surface of the cooperating trunnions 5a–5b–5c–5d rolls over said outer surface as allowed by the above-mentioned clearance while urging said cooperating trunnions towards the corresponding trunnion on the opposite jaw. Consequently, during operation of the apparatus, that is during oscillation of the links 8 and 12, the semi-circular recesses 7, 9, 10 and 11 roll over the corresponding trunnions 5a, 5b, 6a, 6b, which are in contact therewith only along a single line of tangency.

The above-described improvement has therefore for its result to reduce friction to a minimum and consequently to allow a more rational and more efficient clamping of the cable by the jaws.

What I claim is:

In combination with a pair of cooperating jaws each of which includes two equally spaced semi-cylindrical trunnions bounded by a flat surface facing the opposite jaw, said jaws being adapted to clamp therebetween a hauling and hoisting cable, the provision of two parallel links spaced longitudinally of the jaws by a distance equal to the spacing of the trunnions and provided each with an aperture constituted by two semi-circular recesses adapted to house corresponding trunnions on the cooperating jaws, said recesses of each aperture being longitudinally offset with respect to one another and opening into one another along a common diametral boundary line, each recess having a radius larger than that of the semi-cylindrical trunnion to be accommodated within said recess and having a center which is offset from that of the corresponding trunnion whereby said trunnion is in contact with the corresponding recess along a single line of tangency and thereby allows slight rolling of each trunnion along the semi-circular outline of the corresponding recess upon angular shifting of the links with reference to the jaws.

References Cited in the file of this patent

UNITED STATES PATENTS

| | | |
|---|---|---|
| 1,320,600 | Bush | Nov. 4, 1919 |
| 1,464,939 | Kearney | Aug. 14, 1928 |
| 2,585,101 | Faure | Feb. 12, 1952 |
| 2,995,339 | Persiaux | Aug. 8, 1961 |

FOREIGN PATENTS

| | | |
|---|---|---|
| 733,774 | France | July 18, 1932 |